United States Patent
Linden et al.

(10) Patent No.: US 10,417,324 B1
(45) Date of Patent: Sep. 17, 2019

(54) METHOD AND SYSTEM FOR ACCESSING A DYNAMIC TRANSACTION FORM WITHIN A WEBPAGE OF A FINANCIAL APPLICATION

(71) Applicants: Amanda Meek Linden, San Carlos, CA (US); Dorelle Rabinowitz, Santa Clara, CA (US); Klaus Moeller Kaasgaard, Redwood City, CA (US); Joseph Wells, Mountain View, CA (US); Joseph Davidchik, Alameda, CA (US); Susan Gov Le, Pflugerville, TX (US); Marcus Edward Piña, Austin, TX (US); Priyajeet Hora, Sunnyvale, CA (US)

(72) Inventors: Amanda Meek Linden, San Carlos, CA (US); Dorelle Rabinowitz, Santa Clara, CA (US); Klaus Moeller Kaasgaard, Redwood City, CA (US); Joseph Wells, Mountain View, CA (US); Joseph Davidchik, Alameda, CA (US); Susan Gov Le, Pflugerville, TX (US); Marcus Edward Piña, Austin, TX (US); Priyajeet Hora, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 211 days.

(21) Appl. No.: 14/320,529

(22) Filed: Jun. 30, 2014

(51) Int. Cl.
*G06F 17/24* (2006.01)
*G06Q 40/00* (2012.01)
(Continued)

(52) U.S. Cl.
CPC .......... *G06F 17/243* (2013.01); *G06F 3/0484* (2013.01); *G06F 3/0488* (2013.01); *G06Q 30/04* (2013.01); *G06Q 40/00* (2013.01)

(58) Field of Classification Search
CPC .... G06F 17/243; G06F 3/0484; G06F 3/0488; G06Q 30/04; G06Q 40/00
(Continued)

(56) References Cited

U.S. PATENT DOCUMENTS

2009/0132417 A1* 5/2009 Scipioni ................. G06Q 20/12
705/44

OTHER PUBLICATIONS

"PayPal Invoicing User's Guide", Sep. 2010, PayPal, <https://www.paypalobjects.com/webstatic/en_US/developer/docs/pdf/pp_invoicing_users_guide.pdf>.*

(Continued)

*Primary Examiner* — Stephen S Hong
*Assistant Examiner* — Broderick C Anderson
(74) *Attorney, Agent, or Firm* — Ferguson Braswell Fraser Kubasta PC

(57) ABSTRACT

A method for accessing a dynamic transaction form within a webpage of a financial application includes receiving an initialization of the dynamic transaction form displayed on the webpage, generating the dynamic transaction form at a top portion of the webpage, sliding the dynamic transaction form from the top portion to a bottom portion of the webpage, and receiving a form input from within the dynamic transaction form. The method further includes completing, without the intervention of the user, a dependent transaction form element in the dynamic transaction form using the form input, receiving a selection of a submit button in the dynamic transaction form, closing, based on the selection, the dynamic transaction form by slidingly returning the dynamic transaction form from the bottom portion back to the top portion of the webpage, and performing a transaction triggered by closing the dynamic transaction form.

23 Claims, 9 Drawing Sheets

(51) Int. Cl.
*G06Q 30/04* (2012.01)
*G06F 3/0488* (2013.01)
*G06F 3/0484* (2013.01)

(58) Field of Classification Search
USPC ........................................................ 715/224
See application file for complete search history.

(56) References Cited

OTHER PUBLICATIONS

"PayPal Merchant Setup and Administration Guide", Sep. 2012, PayPal, <https://www.paypalobjects.com/webstatic/en_US/developer/docs/pdf/pp_merchantsetupadministrationguide.pdf>.*

Motto, "Flawless clickable drop-down navigation", <http://www.toddmotto.com/flawless-clickable-drop-down-navigation>, published prior to: Nov. 29, 2012.*

Ajatix, "Advanced CSS Drop Down Menu 2—Expression Web Add-In," <http://ajatix.com/css-drop-down-menu/expression-web-add-in.html>, published prior to: Apr. 30, 2013.*

Mitchell, "Creating Dynamic Data Entry User Interfaces," <http://msdn.microsoft.com/en-us/library/aa479330.aspx>, ASP.net Technical Articles, Published prior to: Aug. 28, 2008.*

"About WageWorks"; WageWorks.com; <http://www.wageworks.com:80/about/default.htm>; published prior to: Oct. 30, 2013.*

"26 ecommerce mega menus dissected"; Matt Clark; econsultancy.com; <https://econsultancy.com/blog/7734-26-ecommerce-mega-menus-dissected>; published Jul. 4, 2011 (Year: 2011).*

"Ondeactivate event | deactivate event"; Dottoro; <http://help.dottoro.conn/ljoqfkft.php>, 2009 (Year: 2009).*

"Making a Cool Login System with PH, MySQL and jQuery"; Tutorialzine; Martin; <https://tutorialzine.com/2009/10/cool-login-system-php-jquery>, Oct. 2009 (Year: 2009).*

"Close Dropdowns by clicking outside of them with jQuery"; Craig M. Dennis; <http://craigmdennis.com:80/articles/close-dropdowns-clicking-outside-jquery/>; Jun. 27, 2012 (Year: 2012).*

\* cited by examiner

METHOD AND SYSTEM FOR ACCESSING A DYNAMIC TRANSACTION FORM WITHIN A WEBPAGE OF A FINANCIAL APPLICATION

BACKGROUND

Typically, when a user fills out forms in an application, the user has to navigate to the correct form through a menu from a starting webpage, complete the form, and then navigate back to the desired webpage. This style of user interface requires that the user perform more than once step to reach the form page and fill it out, and is a lengthy form of navigation. In this workflow, context may not be retained between the starting point (e.g. the webpage), and the end point (e.g. the form). Furthermore, the navigation from a webpage to a form is typically performed in one graphical style. In other words, the form is another webpage that takes the place of the original webpage.

SUMMARY

In general, in one aspect, the invention relates to a method for accessing a dynamic transaction form within a webpage of a financial application. The method comprises: receiving, at a first time from a user of the financial application, an initialization of the dynamic transaction form displayed on the webpage; generating, at a second time following the initialization, the dynamic transaction form at a top portion of the webpage; sliding, by the user at a third time after the second time, the dynamic transaction form from the top portion to a bottom portion of the webpage; receiving, from the user, a form input from within the dynamic transaction form; completing, without the intervention of the user, a dependent transaction form element in the dynamic transaction form using the form input; receiving, from the user, a selection of a submit button in the dynamic transaction form; closing, at a fourth time after the third time and based on the selection received from the user, the dynamic transaction form by slidingly returning the dynamic transaction form from the bottom portion back to the top portion of the webpage; and performing a transaction triggered by closing the dynamic transaction form at the fourth time.

In general, in one aspect, the invention relates to a system for accessing a dynamic transaction form within a webpage of a financial application. The system comprises: a processor; a transaction processing application, executing on the processor, for: receiving, at a first time from a user of the financial application, an initialization of the dynamic transaction form displayed on the webpage, generating, at a second time following the initialization, the dynamic transaction form at a top portion of the webpage, sliding, by the user at a third time after the second time, the dynamic transaction form from the top portion to a bottom portion of the webpage, receiving, from the user, a form input from within the dynamic transaction form, completing, without the intervention of the user, a dependent transaction form element in the dynamic transaction form using the form input, receiving, from the user, a selection of a submit button in the dynamic transaction form, closing, at a fourth time after the third time and based on the selection received from the user, the dynamic transaction form by slidingly returning the dynamic transaction form from the bottom portion back to the top portion of the webpage, and performing a transaction triggered by closing the dynamic transaction form at the fourth time.

In general, in one aspect, the invention relates to a non-transitory computer readable storage medium storing instructions for accessing a dynamic transaction form within a webpage of a financial application. The instructions are executable on a processor and comprising functionality for: receiving, at a first time from a user of the financial application, an initialization of the dynamic transaction form displayed on the webpage; generating, at a second time following the initialization, the dynamic transaction form at a top portion of the webpage; sliding, by the user at a third time after the second time, the dynamic transaction form from the top portion to a bottom portion of the webpage; receiving, from the user, a form input from within the dynamic transaction form; completing, without the intervention of the user, a dependent transaction form element in the dynamic transaction form using the form input; receiving, from the user, a selection of a submit button in the dynamic transaction form; closing, at a fourth time after the third time and based on the selection received from the user, the dynamic transaction form by slidingly returning the dynamic transaction form from the bottom portion back to the top portion of the webpage; and performing a transaction triggered by closing the dynamic transaction form at the fourth time.

Other aspects of the invention will be apparent from the following description and the appended claims.

DETAILED DESCRIPTION

Figure 1:
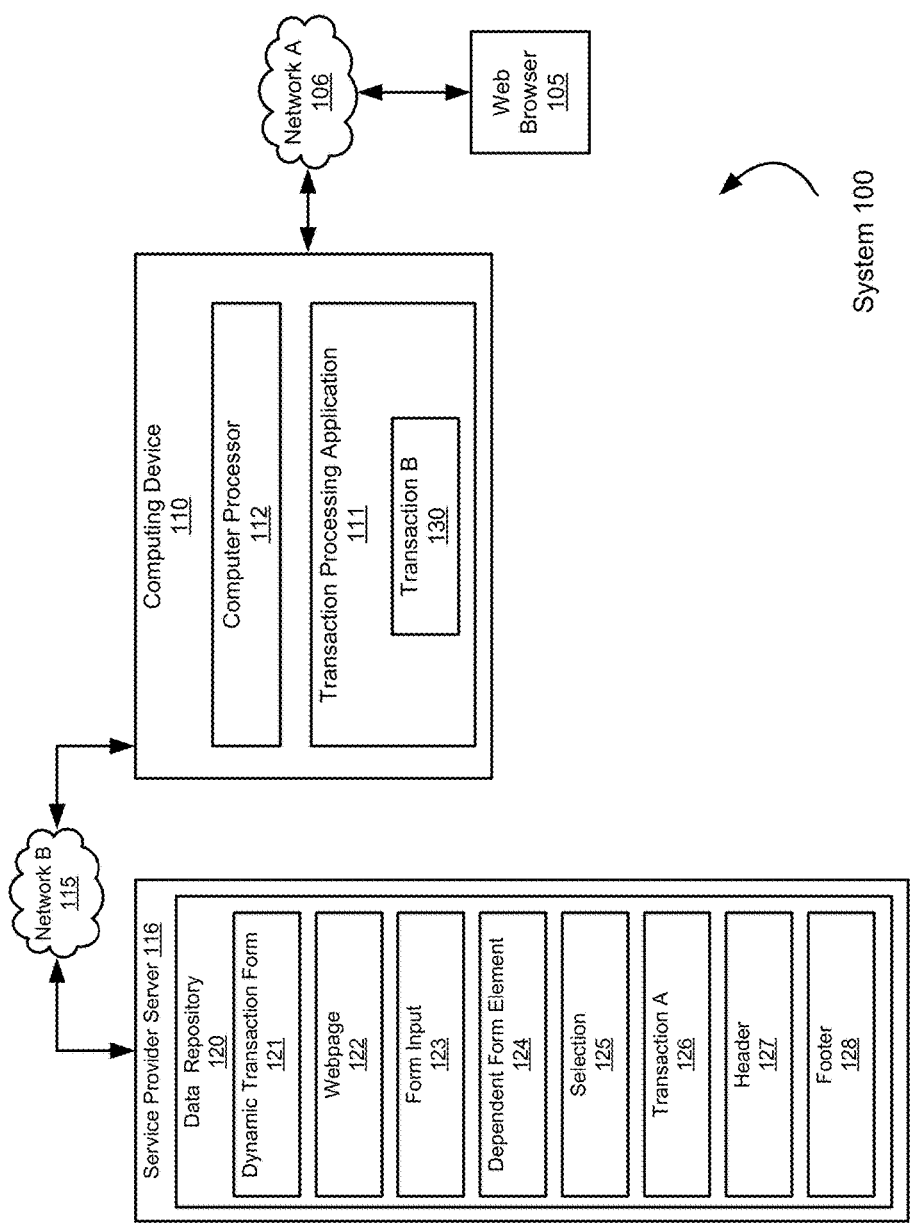
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for accessing a dynamic transaction form within a webpage of a financial application. Specifically, the system and method may perform the steps of receiving, at a first time from a user of the financial application, an initialization of the dynamic transaction form displayed on the webpage, generating, at a second time following the initialization, the dynamic transaction form at a top portion of the webpage; sliding, by the user at a third time after the second time, the dynamic transaction form from the top portion to a bottom portion of the webpage; receiving, from the user, a form input from within the dynamic transaction form; completing, without the intervention of the user, a dependent transaction form element in the dynamic transaction form using the form input; receiving, from the user, a selection of a submit button in the dynamic transaction form; closing, at a fourth time after the third time and based on the selection received from the user, the dynamic transaction form by slidingly returning the dynamic transaction form from the bottom portion back to the top portion of the webpage; and performing a transaction triggered by closing the dynamic transaction form at the fourth time.

In general, embodiments of the invention provide for a form and/or page that comes down over a webpage of an application like a slice of paper appearing on a desk. The page is an object that can appear from anywhere in the application. These object pages may be combined to personalize the experience of a user. In other words, the user interface element (also known as a dynamic transaction form) allows a user to complete a workflow and then return to a previous webpage. Elements in the user interface element may be accessed from any part of a webpage (such as the top, bottom, right, left, middle, top right corner, top left corner, bottom left corner, bottom right corner, etc.) and automatically added to the form. After submitting the form, a user is able to continue in their previous context (e.g. the webpage). In this way, the invention allows for a seamless way to enter transactions with a unique user interface motion.

FIG. 1 shows a system (100) in accordance with one or more embodiments of the invention. As shown in FIG. 1, the system (100) includes components such as a web browser (105), a network A (106), a computing device (110), a transaction processing application (111), a network B (115), a service provider server (116), a data repository (120), and a transaction B (130). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be more than one transaction processing application and data repository running on a device, as well as more than one web browser, computing device, and service provider server interfacing with those components.

In one or more embodiments of the invention, the web browser (105) is a web application with functionality to access the Internet and the transaction processing application (111). For example, a user of the browser (105) may access the transaction processing application (111) and/or a financial application over network A (106). Those skilled in the art will appreciate that multiple users may access the web browser (105), and that multiple instances of the transaction processing application may be accessed through the web browser (105). A user may be an owner of a business that utilizes the services of the transaction processing application (111).

In one or more embodiments of the invention, a computing device (110) running on a computer processor (112) and includes functionality to host the transaction processing application (111), which includes functionality to receive an initialization of a dynamic transaction form displayed on a webpage, generate a dynamic transaction form at a top portion of the webpage, slide the dynamic transaction form from the top portion to a bottom portion of the webpage, and receive a form input from within the dynamic transaction form. The transaction processing application (111) includes functionality to complete a dependent transaction form element in the dynamic transaction form using the form input, receive a selection of a submit button in the dynamic transaction form, close the dynamic transaction form by sliding it and returning the dynamic transaction form from the bottom portion back to the top portion of the webpage, and perform a transaction triggered by closing the dynamic transaction form at the fourth time. The transaction processing application (111) is a software application that may run within a financial application, and is configured to perform the specific functions mentioned above, as well as to perform other calculations associated with accessing a dynamic transaction form within a webpage of a financial application. Those skilled in the art will appreciate that the computing device (110) may also be a mobile device (e.g. a mobile phone a tablet, and the like).

The transaction processing application (111) may receive input from various sources, including users of the transaction processing application (111), businesses (e.g. companies) utilizing the transaction processing application (111), and third parties. The transaction processing application (111) may store data in and/or access data from a data repository (120). In one or more embodiments of the invention, the computing device (110), service provider server (116), transaction processing application (111), and other data stored on the computing device (110), the service provider server (116), and/or the data repository (120) may be owned and/or operated by a service provider (e.g. the owner, developer, and/or manager of the transaction processing application (111)).

In one or more embodiments of the invention, the transaction processing application (111) includes functionality to receive, from a user of the financial application, an initialization of the dynamic transaction form displayed on the webpage. The webpage (122) may be any page in a website of the financial application. For example, the webpage (122) may relate to the expenses of a user of the financial application. The dynamic transaction form (121) is a graphical user interface that accepts information provided by a user and that appears over the webpage. The dynamic transaction form (121) may have a header (127), which is a top portion of the dynamic transaction form (121) that may contain information relating to the dynamic transaction form (121) as well as various functionalities (e.g. close the form, information, settings, and the like). The dynamic transaction form (121) may have a footer (128), which is a bottom portion of the dynamic transaction form (121) that may contain information relating to the dynamic transaction form (121) as well as various functionalities (e.g. cancel, clear, save, and the like).

In one or more embodiments of the invention, the transaction processing application (111) includes functionality to generate the dynamic transaction form at a top portion of the webpage. For example, the dynamic transaction form may appear at the very top portion of the webpage as part of a graphical user interface motion. In one or more embodiments of the invention, the transaction processing application (111) includes functionality to slide the dynamic transaction form from the top portion to a bottom portion of the webpage. Sliding the dynamic transaction form from the top portion to a bottom portion of the webpage may be performed in a smooth motion for the user of the application.

In one or more embodiments of the invention, the transaction processing application (111) includes functionality to receive a form input from within the dynamic transaction form. The form input (123) is information provided by the user of the financial application and/or transaction processing application (111), that may relate to a business or financial concern of the user. In one or more embodiments of the invention, the transaction processing application (111) includes functionality to complete, without the intervention of the user, a dependent transaction form element in the dynamic transaction form using the form input. The dependent form element (124) (also known as a dependent transaction form element) is a form element that is completed based on the form input. For example, the form input may be a customer name, and the dependent form element may be a billing address of the customer (e.g. the form input).

In one or more embodiments of the invention, the transaction processing application (111) includes functionality to receive a selection of a submit button in the dynamic transaction form. The selection (125) may be performed, for example, when the user clicks a submit button. In one or more embodiments of the invention, the transaction processing application (111) includes functionality to close the dynamic transaction form by slidingly returning the dynamic transaction form from the bottom portion back to the top portion of the webpage. The term slidingly refers to the motion that the dynamic transaction form may make. In other words, the dynamic transaction form may move in a smooth and consistent motion from the bottom to the top of the webpage.

In one or more embodiments of the invention, the transaction processing application (111) includes functionality to perform a transaction triggered by closing the dynamic transaction form. The transaction A (126) may be any operation relating to finances or business matters of the user. For example, the transaction A (126) may be the completion of an invoice for a customer of the user (e.g. the owner of a business), or a time sheet for employees of the user. The transaction B (130) may be a processed version of the transaction A (126), and the transaction A (126) may be a stored version of the transaction B (130). The transaction processing application (111) may receive any of the elements described above from various sources, including the web browser (105). After receiving and/or generating each element, the transaction processing application (111) may process (i.e. modify, transform, format) those elements. Those skilled in the art will appreciate that the transaction processing application (111) may receive those elements from other entities beyond the web browser (105), and may perform other functions beyond those disclosed.

In one or more embodiments of the invention, the service provider server (116) includes functionality to host a data repository (120). The data repository (120) may contain data associated with the transaction processing application (111). The data repository (120) may be a relational database, database management system, or any data store that stores data entries associated with the transaction processing application (111). The data repository (120) may also be a spreadsheet containing data cells associated with the transaction processing application (111). In one or more embodiments of the invention, the data repository (120) may be implemented with many technologies. The data repository (120) may receive data from various sources, including the transaction processing application (111), over a network B (115). After receiving data from the transaction processing application (111), the data repository (120) may process (i.e. modify, transform, format) the data, and then store the data. The data may include, but is not limited to, a dynamic transaction form (121), a webpage (122), a form input (123), a dependent form element (124), a selection (125), a transaction A (126), a header (127), and a footer (128).

Those skilled in the art will appreciate that the data repository (120) may receive and store data from other entities beyond the transaction processing application (111), and may perform other functions beyond those disclosed. Further, the service provider server (116), and the data stored on this server may be owned and/or operated by a service provider (e.g. the owner, developer, and/or manager of the transaction processing application).

In one or more embodiments of the invention, a Graphical User Interface ("GUI") (not shown) may display information associated with the transaction processing application (111). The GUI may be viewed in the web browser (105), an application window, and the like. The GUI may be viewed in these display technologies by a user of the transaction processing application (111). The GUI may include standard web elements, including video, audio, and text, as well as interface technologies not limited to text submission on forms, voice capture, and user gesture interpretation. In one or more embodiments of the invention there may be various other display technologies used by and to view the GUI.

Figure 2:
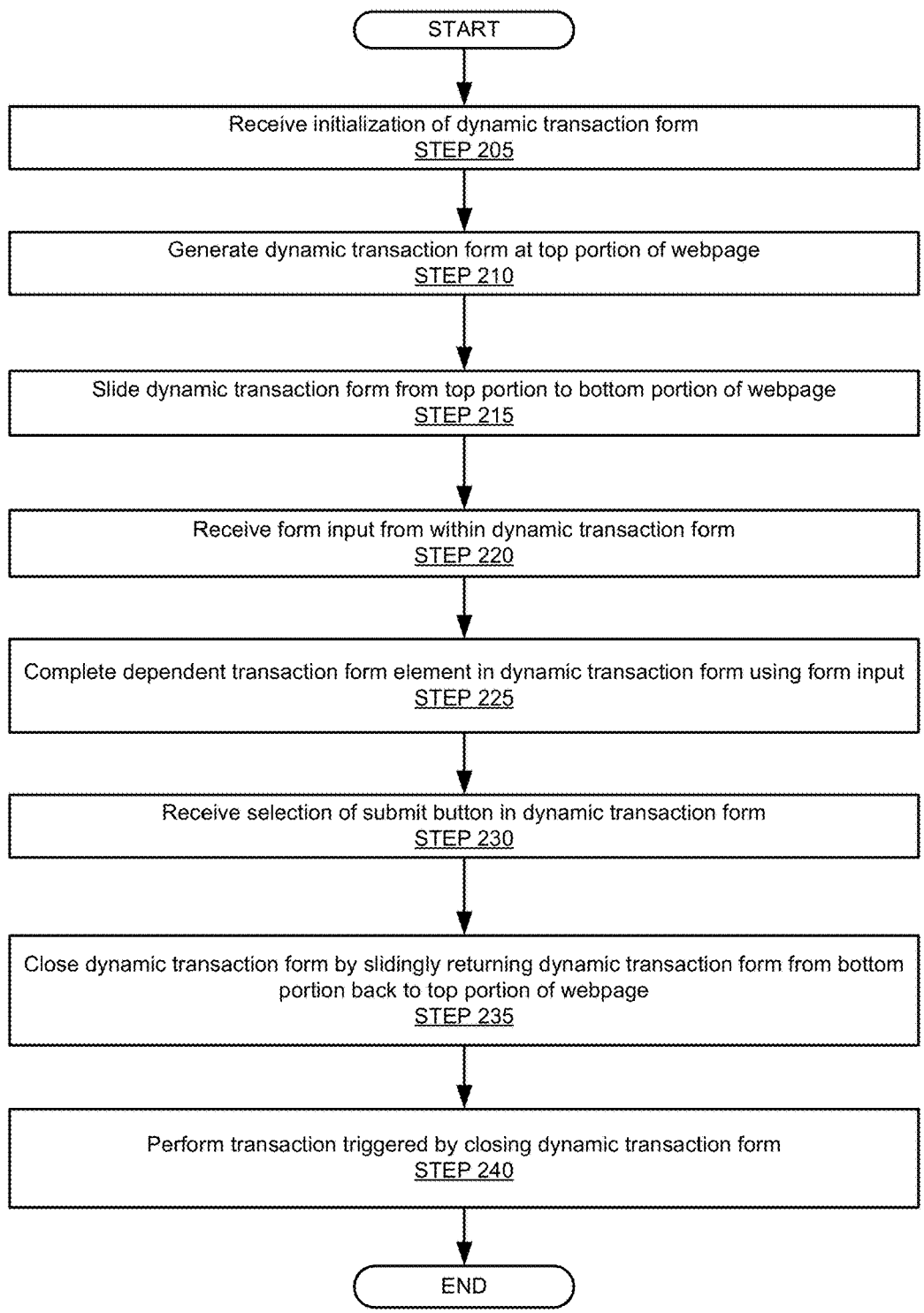
FIG. 2 shows a flowchart in accordance with one or more embodiments of the invention.

FIG. 2 shows a flowchart in accordance with one or more embodiments of the invention. The process shown in FIG. 2 may be used, for example, with the system (100), to access a dynamic transaction form within a webpage of a financial application. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 205, an initialization of the dynamic transaction form displayed on the webpage is received. The initialization may be received at a first time period from a user of the financial application. The initialization may be, for example, in the form of a click of a button received from the user. The first time period may represent the beginning of the process described in STEPS 205-240.

In STEP 210, the dynamic transaction form is generated at a top portion of the webpage. This may occur at a second time period following the initialization. The second time period is a time period after the first time period. The generation of the dynamic transaction form may include the presentation of a bottom portion of the dynamic transaction form in a graphical format within a webpage to the user.

In STEP 215, the dynamic transaction form is slid from the top portion to a bottom portion of the webpage. This movement may be initiated by the user at a third time period (e.g. after the second time period). The sliding motion may be performed in a smooth manner in the GUI of the financial application in a web-based or stand-alone traditional or mobile platform.

In STEP 220, a form input is received from within the dynamic transaction form. The form input may be received from the user, and may be any information relating to the finances and/or business concerns of the user. For example, the form input may be a customer name.

In STEP 225, a dependent transaction form element is completed in the dynamic transaction form using the form input. This may be performed without the intervention of the user. For example, the dependent transaction form element may be a charge related to the customer name.

In STEP 230, a selection of a submit button is received in the dynamic transaction form. The selection may be performed by the user.

In STEP 235, the dynamic transaction form is closed by slidingly returning the dynamic transaction form from the bottom portion back to the top portion of the webpage. This may be performed at a fourth time period (e.g. after the third time period) and based on the selection received from the user. The sliding motion may be a smooth motion in the graphical interface.

In STEP 240, a transaction is performed. This may be triggered by closing the dynamic transaction form at the fourth time period. The transaction may relate to a credit, charge, billable time, or any other concern of a business.

Figure 3A:
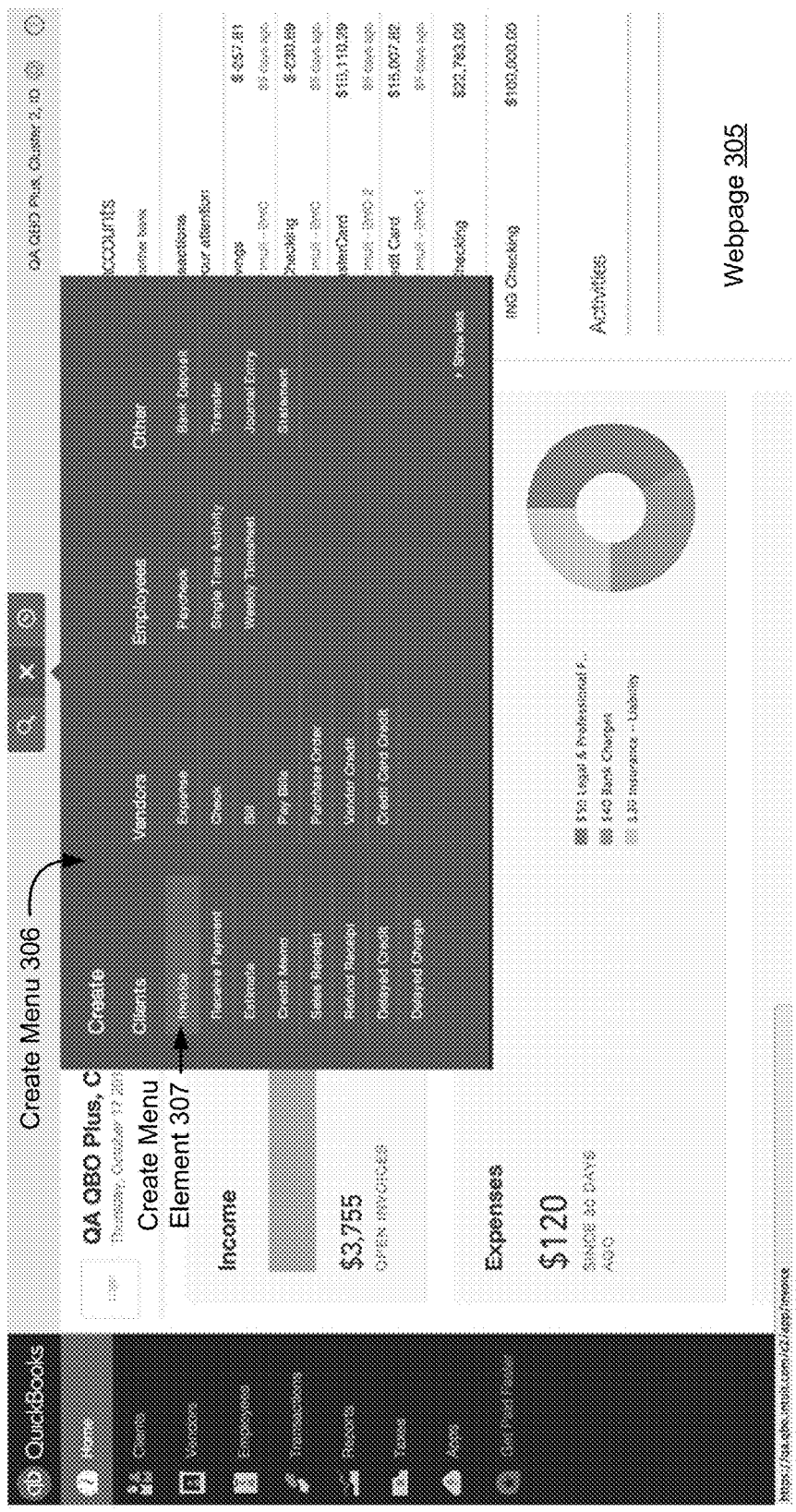
FIGS. 3A, 3B, 3C, 4A, 4B, and 4C show examples in accordance with one or more embodiments of the invention.

FIG. 3A shows an example in accordance with one or more embodiments of the invention. The graphical user interface elements shown in FIG. 3A may be used, for example, with the system (100), to generate a dynamic transaction form. The elements shown in FIG. 3A may differ among embodiments of the invention, and one or more of the elements may be optional.

In FIG. 3A, a webpage (305) is displayed to a user (e.g. in a financial application). The webpage (305) may relate to a financial or business concern of the user and/or the user's business. As seen in FIG. 3A, the webpage (305) may relate to income and expenses. The webpage (305) may contain a create menu (306), which may contain various categories relating to clients, vendors, employees, and other business concerns, and one or more elements (307). The client categories may contain, for example, invoice, receive payment, estimate, credit memo, sales receipt, refund receipt, delayed credit, delayed charge, as well as other such categories.

The vendor categories may contain, for example, expense, check, bill, pay bills, purchase offers, vendor credit, credit card credit, as well as other related categories. The employees categories may contain, for example, paycheck, single time activity, weekly timesheet, as well as other related categories. Other categories may include, for example, bank deposit, transfer, journal entry, statement, and other related categories. The selection of a category by a user may activate a dynamic transaction form relating to that category (as shown in FIG. 3B).

Figure 3B:
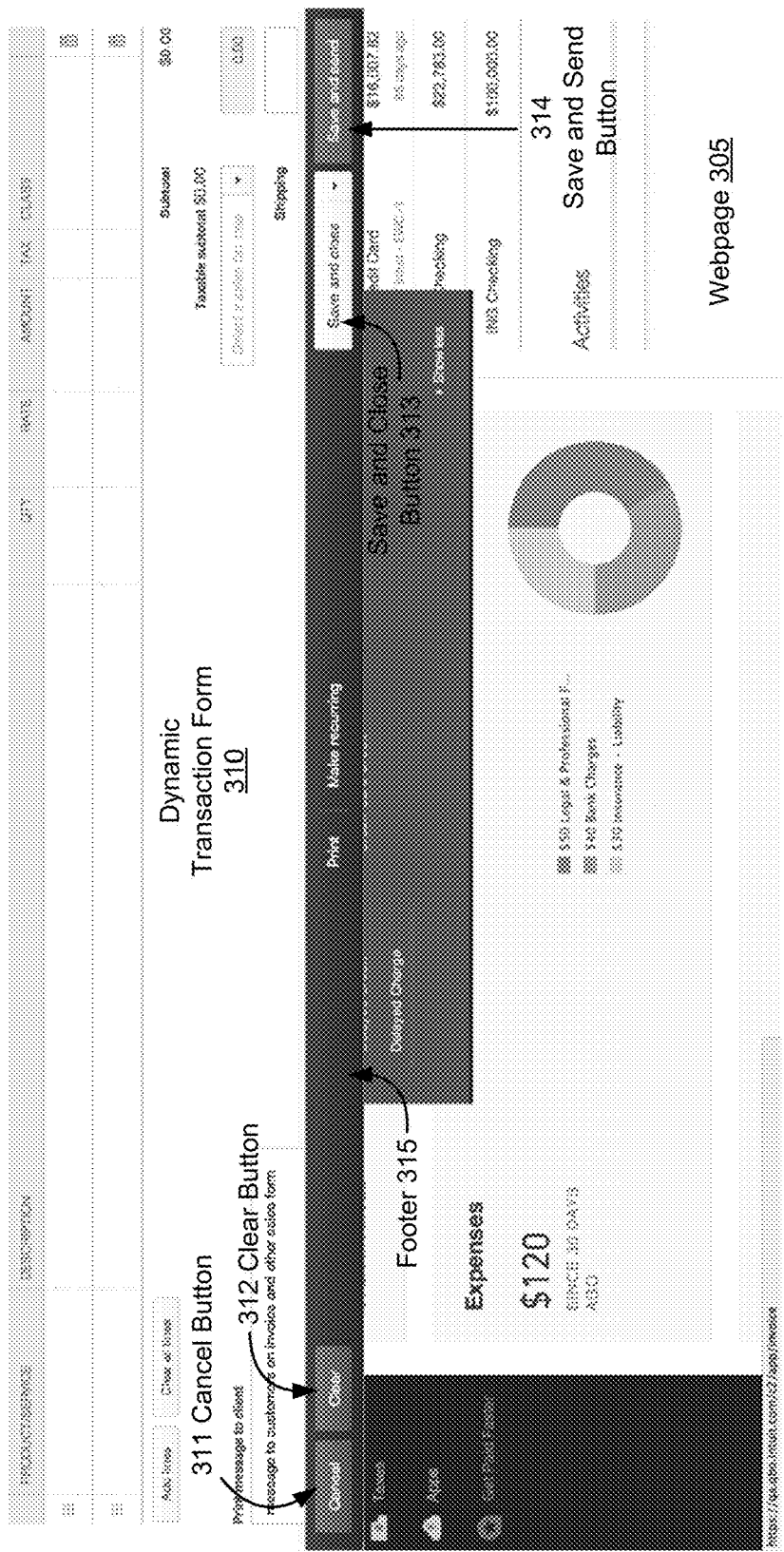

FIG. 3B shows an example in accordance with one or more embodiments of the invention. The graphical user interface elements shown in FIG. 3B may show, for example, a dynamic transaction form. The elements shown in FIG. 3B may differ among embodiments of the invention, and one or more of the elements may be optional.

In FIG. 3B, a dynamic transaction form (310) is displayed. The dynamic transaction form (310) may be generated by the selection of one of the categories shown in FIG. 3A by the user. The dynamic transaction form (310) may appear at the top of the webpage (305), and slide down towards the bottom of the webpage (305). The dynamic transaction form (310) may include a footer (315) with a cancel button (311), to cancel the operation being performed by the dynamic transaction form (310) and close the dynamic transaction form (310). The dynamic transaction form (310) may also have a clear button (312), which may clear all of the content in the dynamic transaction form (310) and the inputs of the dynamic transaction form (310). The dynamic transaction form (310) may also contain a save and close button (313), for saving the content in the dynamic transaction form (310) and closing the dynamic transaction form (310). The dynamic transaction form (310) may also contain a save and send button (314) for saving the content of the dynamic transaction form (310) and sending it to a third party via electronic means. Those skilled in the art will appreciate that the dynamic transaction form (310) may contain various other elements and functionalities not displayed in FIG. 3B.

Figure 3C:
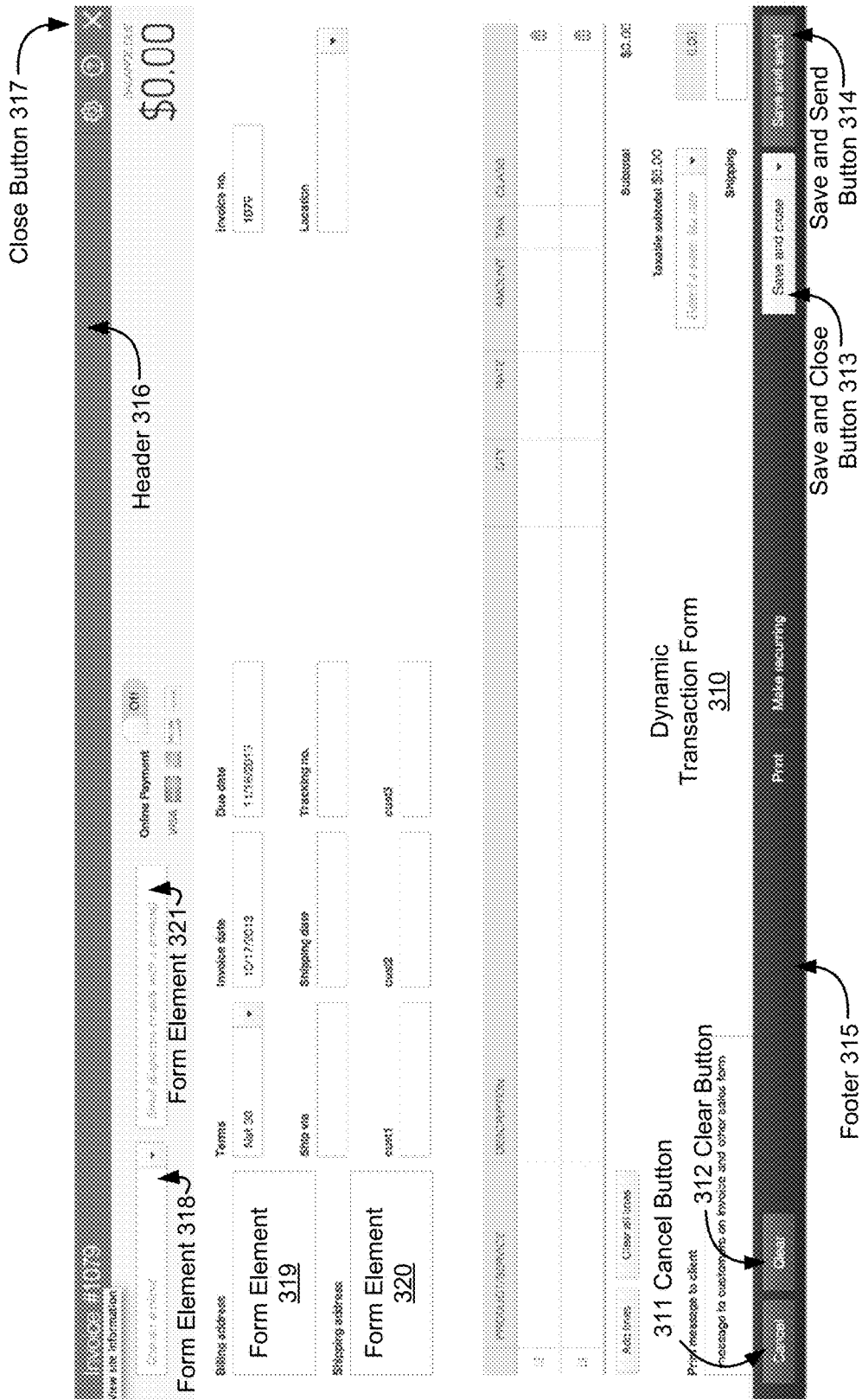

FIG. 3C shows an example in accordance with one or more embodiments of the invention. The graphical user interface elements shown in FIG. 3C may show, for example, a dynamic transaction form. The elements shown in FIG. 3C may differ among embodiments of the invention, and one or more of the elements may be optional.

In FIG. 3C, the dynamic transaction form (310) is shown in a full screen position, after it has slid down over the top to cover the webpage (305). In this position, the dynamic transaction form (310) may contain a footer (315), a header (316) with information (e.g. "Invoice #1079") describing the contents of the dynamic transaction form (310), a close button (317) for closing the dynamic transaction form (310), a help button, a settings button, and various form elements (318)-(321). For example, these form elements may relate to a client name, an email of the client, a form of payment (e.g. a credit card type), a billing address, a shipping address, terms, an invoice date, a due date, shipping details (e.g. shipper, shipping date, tracking no.), an invoice number, a balance due, a product and/or service, description, a quantity, a rate, an amount, a tax, a class, and various other elements relating to an invoice. Those skilled in the art will appreciate that there may be various other form elements and functionalities associated with the dynamic transaction form (310), and that the contents of the dynamic transaction form (310) may relate to various other business concerns beyond an invoice.

Figure 4A:
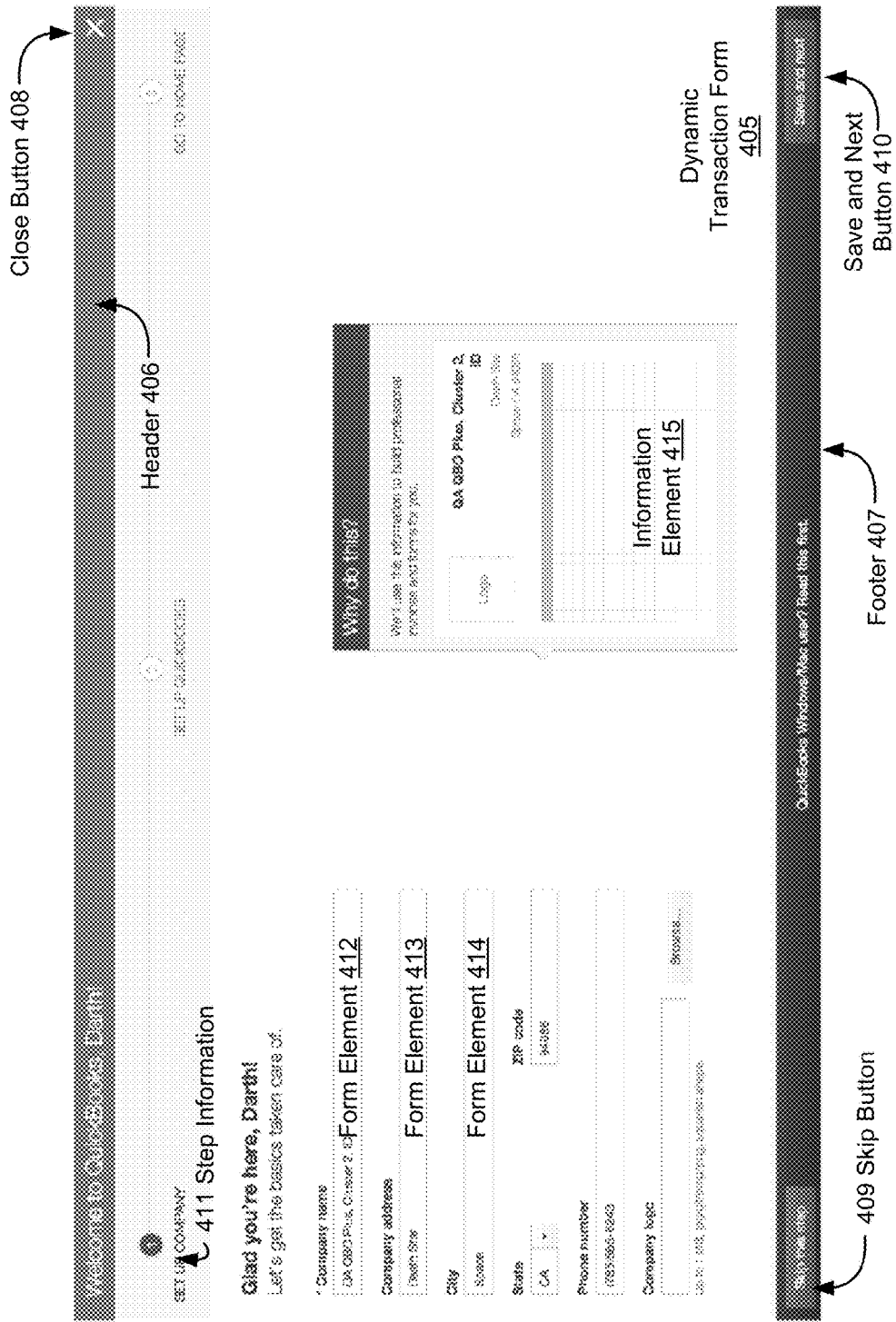

FIG. 4A shows an example in accordance with one or more embodiments of the invention. The graphical user interface elements shown in FIG. 4A may show, for example, a dynamic transaction form. The elements shown in FIG. 4A may differ among embodiments of the invention, and one or more of the elements may be optional.

In FIG. 4A, the dynamic transaction form (405) is shown. The dynamic transaction form (405), similar to the one in FIGS. 3A-3C, may also contain a header (406), a footer (407) with a skip button (409) for skipping the current step, a save and next button (410) for saving the contents of the dynamic transaction form (405) and proceeding to the next step, and a close button (408) to close the dynamic transaction form (405). The dynamic transaction form (405) may also have various step information (411). For example, the flow of the dynamic transaction form (405) may be divided into various steps, such as set up company, set up details, and go to homepage. In FIG. 4A, the contents of the dynamic transaction form (405) relate to the step of setting up a company. There may also be various form elements relating to this step, such as form elements (412)-(414). These may include a company name, a company address, a city, a state, a zip code, a phone number, a company logo, and various other elements relating to setting up a company. Additionally, there may be information elements (e.g. information element (415)) that contain information relating to the current step and/or dynamic transaction form (405) (e.g. "We'll use this information to build professional invoices and forms for you"). Those skilled in the art will appreciate that there may be various other steps, form elements, and information elements associated with the dynamic transaction form (405) in FIG. 4A.

Figure 4B:
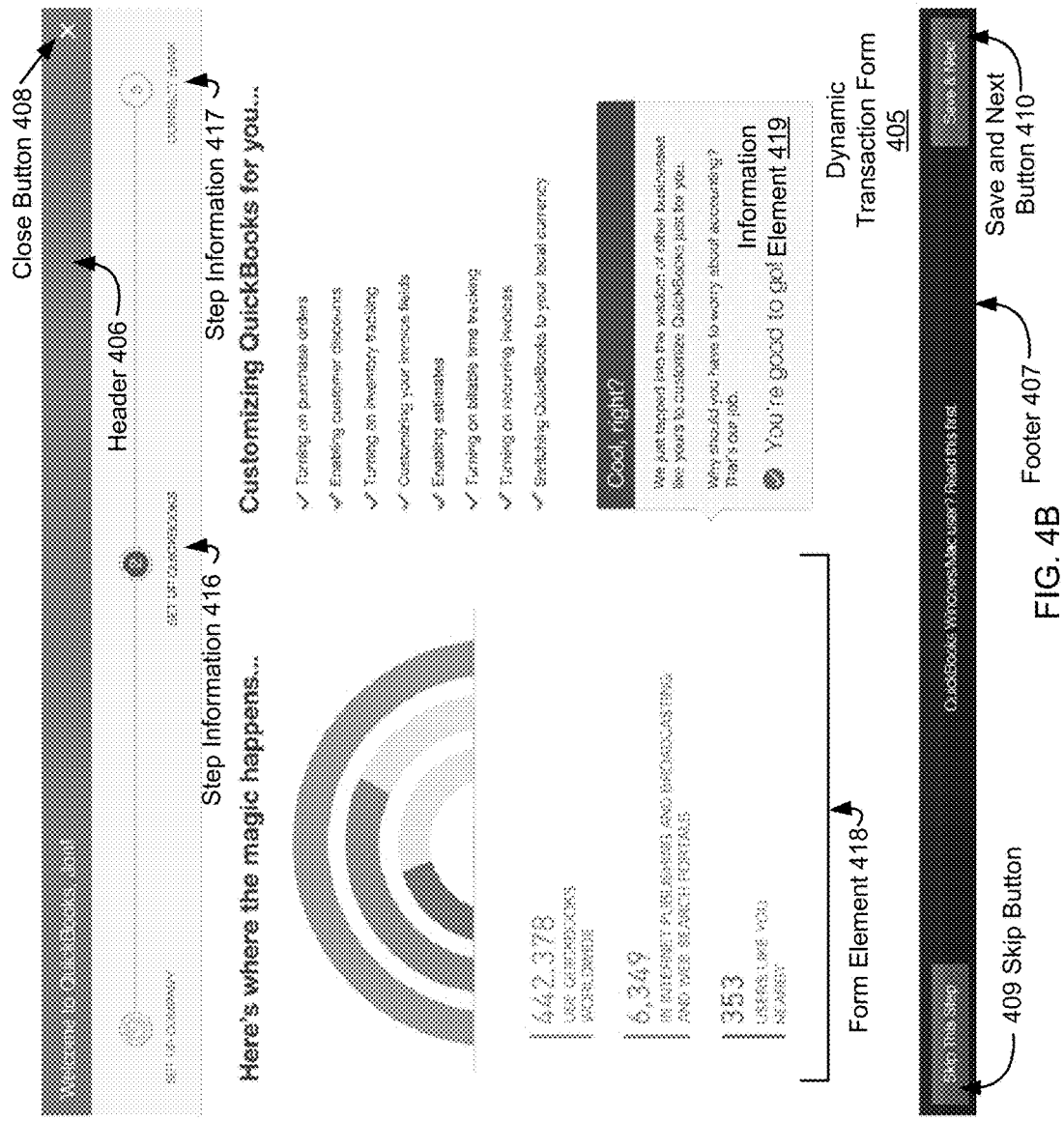

FIG. 4B shows an example in accordance with one or more embodiments of the invention. The graphical user interface elements shown in FIG. 4B may show, for example, a dynamic transaction form. The elements shown in FIG. 4B may differ among embodiments of the invention, and one or more of the elements may be optional.

In FIG. 4B, the dynamic transaction form (405) is shown in a second step. In the second step, relating to step information (416) (e.g. "set up details"), and preceding the next step "connect bank" relating to step information (417), various form elements and information elements are displayed. In this step, a customization of an account related to the user is performed, and information is displayed. For example, in form element (418), statistics of worldwide users and web portals is displayed, along with a graphic showing the information in a visual format. Those skilled in the art will appreciate that a form element may contain various types of information, and may include images, graphics, animations, and other methods for displaying information. The information element (419) describes what occurs in the current step (e.g. "We just tapped into the wisdom of other businesses like yours to customize for you. Why should you have to worry about accounting? That's our job. You're good to go!"), various other steps, form elements, and information elements associated with the dynamic transaction form (405) as shown in FIG. 4B.

Figure 4C:
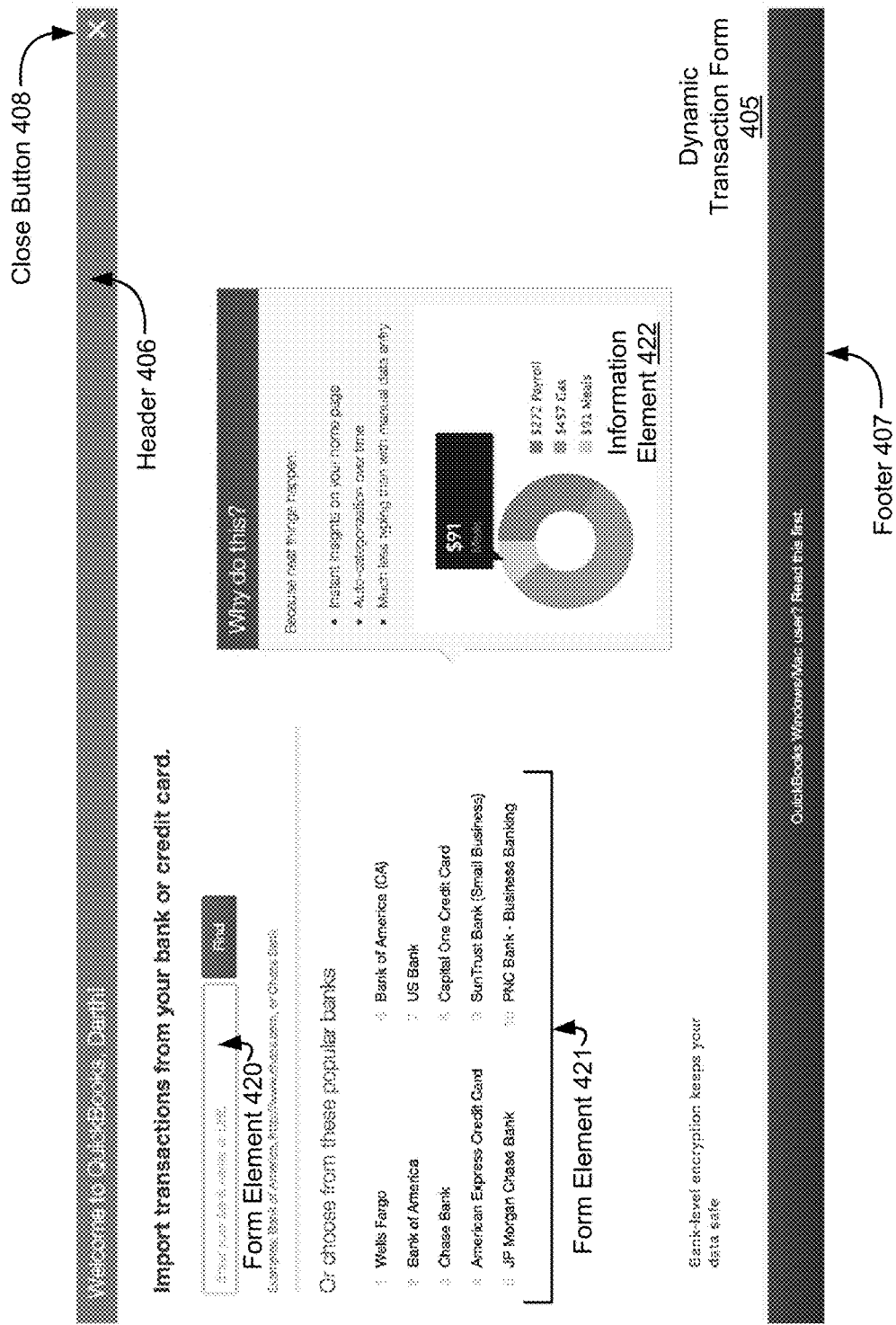

FIG. 4C shows an example in accordance with one or more embodiments of the invention. The graphical user interface elements shown in FIG. 4C may show, for example, a dynamic transaction form. The elements shown in FIG. 4C may differ among embodiments of the invention, and one or more of the elements may be optional.

In FIG. 4C, the dynamic transaction form (405) is shown in a third step. In the third step, connect with a bank, bank information is obtained through form elements (420) and (421). These may include bank names, and a selection of a bank from a list of banks. The information element (422) may describe this step (e.g. "Why do this? Because neat things happen: Instant insights on your homepage, auto-categorization over time, much less typing than with manual data entry") along with a graphic of spending details (e.g. payroll, gas, meals). Those skilled in the art will appreciate that there may be various other steps, form elements, and information elements associated with the dynamic transaction form (405) in FIG. 4C. Those skilled in the art will appreciate that the example dynamic transaction forms shown in FIGS. 3A, 3B, 3C, 4A, 4B, and/or 4C may also be further personalized based on the type of a user, may incorporate a preview display on a part (such as the top, bottom, right, left, middle, top right corner, top left corner, bottom left corner, bottom right corner, etc.) of the form that updates as a user types into the form, may incorporate auto complete functionality, as well as various other functionalities not described.

Figure 5:
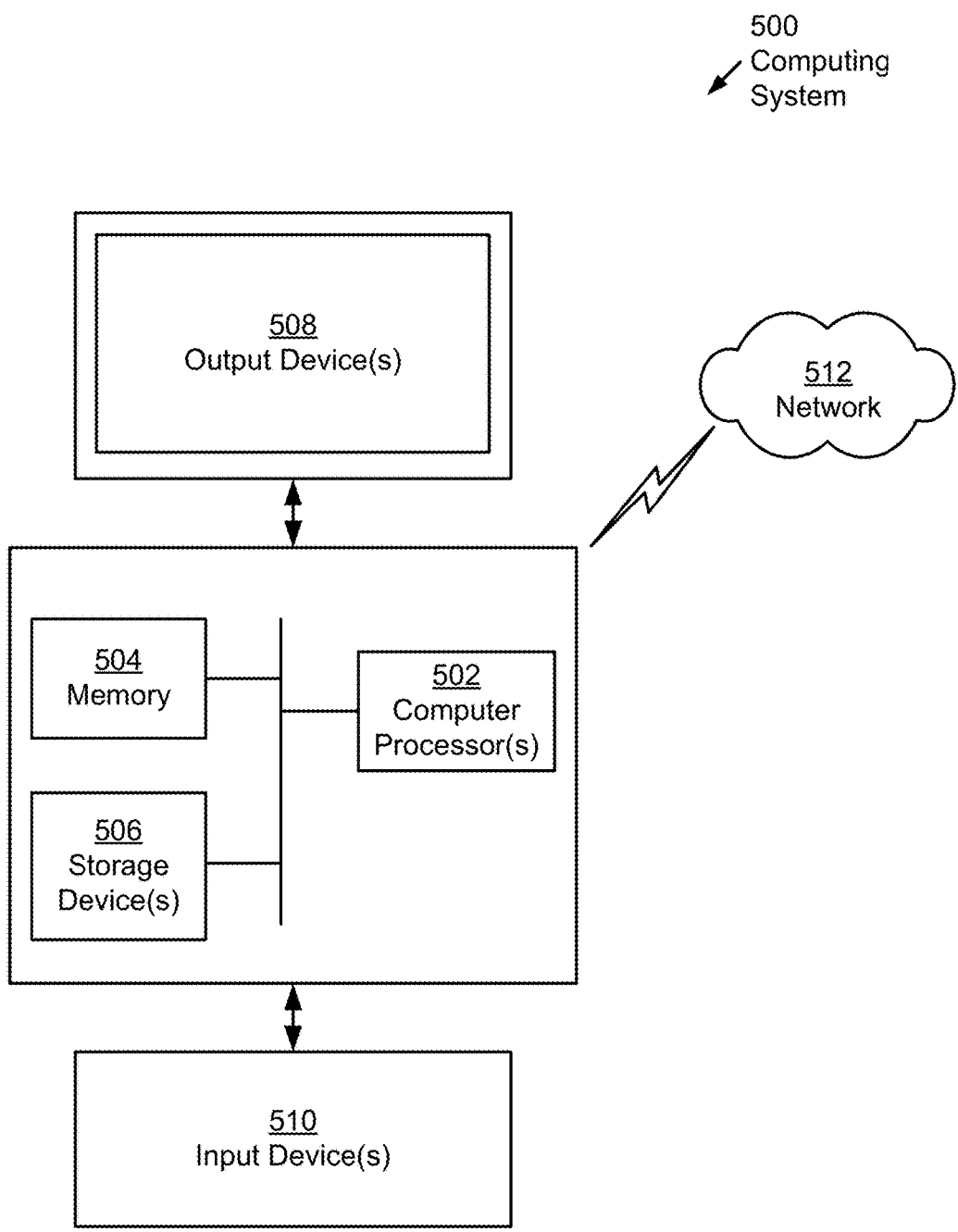
FIG. 5 shows a computer system in accordance with one or more embodiments of the invention.

Embodiments of the invention may be implemented on virtually any type of computing system regardless of the platform being used. For example, the computing system (500) may be one or more mobile devices (e.g., laptop computer, smart phone, personal digital assistant, tablet computer, glasses device, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing a dynamic transaction form within a webpage of a financial application, comprising:
   displaying, within a browser, the webpage comprising a width and a perimeter comprising a top edge;
   receiving, at a first time from a user of the financial application, an initialization of the dynamic transaction form displayed over the webpage;
   identifying a business category associated with the user of the financial application via a menu selection by the user, wherein the business category is selected from the group consisting of clients, vendors, and employees;
   modifying the dynamic transaction form based on the business category of the user to create a modified dynamic transaction form;
   generating, at a second time following the initialization, the modified dynamic transaction form comprising the width;
   sliding down, at a third time after the second time, the modified dynamic transaction form from the top edge and over the webpage to a bottom portion of the webpage;

receiving, from the user, a form input from within the modified dynamic transaction form;

completing, without the intervention of the user, a dependent transaction form element in the modified dynamic transaction form using the form input;

receiving, from the user, a selection of a submit button in the modified dynamic transaction form;

closing, at a fourth time after the third time and based on the selection received from the user, the modified dynamic transaction form by sliding up;

performing a transaction triggered by closing the modified dynamic transaction form at the fourth time;

receiving, from the user, a selection of the webpage outside of the dynamic transaction form; and closing, automatically and in response to the selection, the modified dynamic transaction form.

2. The method of claim 1, further comprising:
displaying, to the user, a confirmation message for the transaction.

3. The method of claim 1, further comprising:
displaying, to the user, the webpage after closing the modified dynamic transaction form.

4. The method of claim 1, further comprising:
receiving, at a fifth time from the user of the financial application, a second initialization of the dynamic transaction form displayed on a second webpage; and
generating, at a sixth time following the second initialization, the modified dynamic transaction form.

5. The method of claim 1, further comprising:
generating, on a part of the webpage, a selectable user interface (UI) comprising a billable time;
receiving, from the user, a selection of the billable time from the selectable UI; and
adding, to the modified dynamic transaction form, the billable time.

6. The method of claim 1, further comprising:
identifying, based on the user, a billing address of a customer of the user; and
completing, without the intervention of the user, a second dependent transaction form element in the modified dynamic transaction form using the billing address.

7. The method of claim 1, wherein sliding down the modified dynamic transaction form is performed in a smooth motion.

8. The method of claim 1, wherein the transaction is an invoice to a customer of the user.

9. The method of claim 1, wherein the form input is a name of a customer of the user and the dependent transaction form element is an invoice of the customer.

10. The method of claim 1, wherein the dynamic transaction form includes a header and a footer, wherein the header contains one or more functionalities and information relating to the modified dynamic transaction form, and the footer includes one or more other functionalities different than the one or more functionalities of the header.

11. A system for accessing a dynamic transaction form within a webpage of a financial application, comprising:
a processor;
a transaction processing application, executing on the processor, for:
displaying, within a browser, the webpage comprising a width and a perimeter comprising a top edge;
receiving, at a first time from a user of the financial application, an initialization of the dynamic transaction form displayed over the webpage,
identify a business category associated with the user of the financial application via a menu selection by the user, wherein the business category is selected from the group consisting of clients, vendors, and employees,
modify the dynamic transaction form based on the business category of the user to create a modified dynamic transaction form,
generate, at a second time following the initialization, the modified dynamic transaction form comprising the width,
sliding down, at a third time after the second time, the modified dynamic transaction form from the top edge and over the webpage to a bottom portion of the webpage,
receiving, from the user, a form input from within the modified dynamic transaction form,
completing, without the intervention of the user, a dependent transaction form element in the modified dynamic transaction form using the form input,
receiving, from the user, a selection of a submit button in the modified dynamic transaction form,
closing, at a fourth time after the third time and based on the selection received from the user, the modified dynamic transaction form by sliding up, and
performing a transaction triggered by closing the modified dynamic transaction form at the fourth time;
receiving, from the user, a selection of the webpage outside of the dynamic transaction form; and
closing, automatically and in response to the selection, the modified dynamic transaction form.

12. The system of claim 10, wherein the transaction processing application is further configured to:
displaying, to the user, the webpage after closing the modified dynamic transaction form.

13. The system of claim 10, wherein the transaction processing application is further configured to:
receive, at a fifth time from the user of the financial application, a second initialization of the dynamic transaction form displayed on a second webpage; and
generate, at a sixth time following the second initialization, the modified dynamic transaction form.

14. The system of claim 10, wherein the transaction processing application is further configured to:
generate, on a part of the webpage, a selectable user interface (UI) comprising a billable time;
receive, from the user, a selection of the billable time from the selectable UI; and
add, to the modified dynamic transaction form, the billable time.

15. The system of claim 10, wherein the transaction processing application is further configured to:
identify, based on the user, a billing address of a customer of the user; and
complete, without the intervention of the user, a second dependent transaction form element in the modified dynamic transaction form using the billing address.

16. The system of claim 10, further comprising:
a data repository comprising the dynamic transaction form, the form input, the dependent form element, the selection, a transaction, a header, and a footer.

17. The system of claim 16, wherein the transaction is an invoice to a customer of the user.

18. The system of claim 16, wherein the form input is a name of a customer of the user and the dependent transaction form element is an invoice of the customer.

19. A non-transitory computer readable storage medium storing instructions for accessing a dynamic transaction form within a webpage of a financial application, the instructions executable on a processor and comprising functionality for:

displaying, within a browser, the webpage comprising a width and a perimeter comprising a top edge;

receiving, at a first time from a user of the financial application, an initialization of the dynamic transaction form displayed over the webpage;

identifying a business category of associated with the user of the financial application via a menu selection by the user, wherein the business category is selected from the group consisting of clients, vendors, and employees;

modifying the dynamic transaction form based on the business category of the user to create a modified dynamic transaction form;

generating, at a second time following the initialization, the modified dynamic transaction form comprising the width;

sliding down, at a third time after the second time, the modified dynamic transaction form from the top edge and over the webpage to a bottom portion of the webpage;

receiving, from the user, a form input from within the modified dynamic transaction form;

completing, without the intervention of the user, a dependent transaction form element in the modified dynamic transaction form using the form input;

receiving, from the user, a selection of a submit button in the modified dynamic transaction form;

closing, at a fourth time after the third time and based on the selection received from the user, the modified dynamic transaction form by sliding up; and performing a transaction triggered by closing the modified dynamic transaction form at the fourth time;

receiving, from the user, a selection of the webpage outside of the dynamic transaction form; and closing, automatically and in response to the selection, the modified dynamic transaction form.

20. The non-transitory computer readable storage medium of claim 19, the instructions further comprising functionality for:

displaying, to the user, the webpage after closing the modified dynamic transaction form.

21. The non-transitory computer readable storage medium of claim 19, the instructions further comprising functionality for:

receiving, at a fifth time from the user of the financial application, a second initialization of the dynamic transaction form displayed on a second webpage; and generating, at a sixth time following the second initialization, the modified dynamic transaction form.

22. The non-transitory computer readable storage medium of claim 19, the instructions further comprising functionality for:

generating, on a part of the webpage, a selectable user interface (UI) comprising a billable time;

receiving, from the user, a selection of the billable time from the selectable UI; and adding, to the modified dynamic transaction form, the billable time.

23. The non-transitory computer readable storage medium of claim 19, the instructions further comprising functionality for:

identifying, based on the user, a billing address of a customer of the user; and completing, without the intervention of the user, a second dependent transaction form element in the modified dynamic transaction form using the billing address.

\* \* \* \* \*